US008966502B2

(12) United States Patent
Kikuchi et al.

(10) Patent No.: US 8,966,502 B2
(45) Date of Patent: Feb. 24, 2015

(54) METHOD AND SYSTEM FOR RECORDING OPERATIONS IN A WEB APPLICATION

(75) Inventors: Katsuro Kikuchi, Musashino (JP); Masashi Egi, Machida (JP); Takao Sakurai, Tokyo (JP); Daisuke Tashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 13/811,880

(22) PCT Filed: Sep. 1, 2010

(86) PCT No.: PCT/JP2010/064934
§ 371 (c)(1),
(2), (4) Date: Jan. 23, 2013

(87) PCT Pub. No.: WO2012/020512
PCT Pub. Date: Feb. 16, 2012

(65) Prior Publication Data
US 2013/0125143 A1    May 16, 2013

(30) Foreign Application Priority Data
Aug. 9, 2010 (JP) .................................. 2010-178550

(51) Int. Cl.
*G06F 13/00* (2006.01)
*G06F 9/54* (2006.01)
(Continued)

(52) U.S. Cl.
CPC ............ *G06F 9/542* (2013.01); *G06F 11/3438* (2013.01); *G06F 11/3476* (2013.01); *G06F 11/3495* (2013.01); *H04L 67/22* (2013.01); G06F 2201/875 (2013.01)
USPC ........................................................ 719/318

(58) Field of Classification Search
CPC ........................................................ G06F 9/542
USPC ........................................................ 719/318
See application file for complete search history.

(56) References Cited

U.S. PATENT DOCUMENTS 8,433,733 B2 * 4/2013 Sayed et al. .................. 707/821
8,639,743 B1 * 1/2014 Colton et al. ................. 709/203
(Continued)

FOREIGN PATENT DOCUMENTS

JP    2004-062446 A    2/2004
JP    2009-104267 A    5/2009
(Continued)

OTHER PUBLICATIONS

Berglund, Anders, et al.; XML Path Language (XPath) 2.0 (Second Edition), W3C Recommendation Dec. 14, 2010 (Link errors corrected Jan. 3, 2011); 2010, pp. 1-6; W3C.
PCT International Search Report on application PCT/JP2010/064934 mailed Nov. 30, 2010; 1 page.

*Primary Examiner* — Andy Ho
(74) *Attorney, Agent, or Firm* — Foley & Lardner LLP

(57) ABSTRACT

Collecting log data efficiently by controlling the capturing event for an operation log on the basis of application layer information. A web server generates a response including an operation log capturing script and the information from an operation log capturing control definition table and a property capturing definition table, and sends the response to a client. In the client, the received information is forwarded from a web browser module to a script engine module. An operation log capturing module sets the information acquisition event handler on the basis of the forwarded information, captures a sequential operation log on the basis of the operations performed by a user in the web browser, and sends the captured sequential operation log to a log server. A log server module collects sequential operation log in an operation log table, and a log analysis module analyzes the collected logs.

15 Claims, 19 Drawing Sheets

(51) Int. Cl.
*G06F 11/34* (2006.01)
*H04L 29/08* (2006.01)

(56) References Cited

U.S. PATENT DOCUMENTS

| | | |
|---|---|---|
| 2004/0030687 A1 | 2/2004 | Hidaka et al. |
| 2008/0046562 A1 | 2/2008 | Butler |
| 2008/0126931 A1* | 5/2008 | Kojima et al. ................ 715/704 |
| 2009/0106769 A1 | 4/2009 | Nakamura |
| 2012/0143947 A1 | 6/2012 | Kikuchi |
| 2013/0185643 A1* | 7/2013 | Greifeneder et al. ......... 715/736 |

FOREIGN PATENT DOCUMENTS

| | | |
|---|---|---|
| JP | 2011-170503 A | 9/2011 |
| WO | WO 2011/155081 A1 | 12/2011 |

* cited by examiner

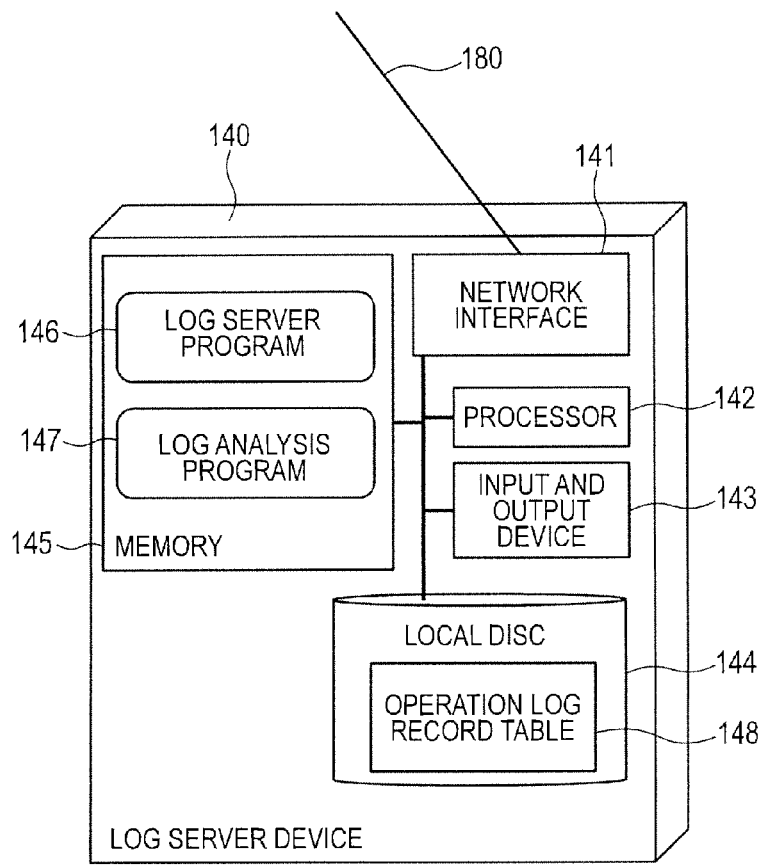

FIG. 1F

| PROPERTY NAME 170 | SOURCE URL 171 | ACQUISITION EXPRESSION 172 | ACQUISITION MOMENT (CHANGE OBJECT) 173 | ACQUISITION MOMENT (ACQUISITION TIMING) 174 |
|---|---|---|---|---|
| name | /index.jsp | /html/body/div/span[@id="name"] | /index.jsp | load |
| point | /index.jsp | /html/body/div/span[@id="point"] | /uinfo.jsp | XHRhandler |
| nitem | /index.jsp | /html/body/div/span[@id="nitem"] | /uinfo.jsp | XHRhandler |
| area | /member.jsp | /html/body/table/tr[@id="area"]/td[1] | /member.jsp | load |
| .. | | | | |

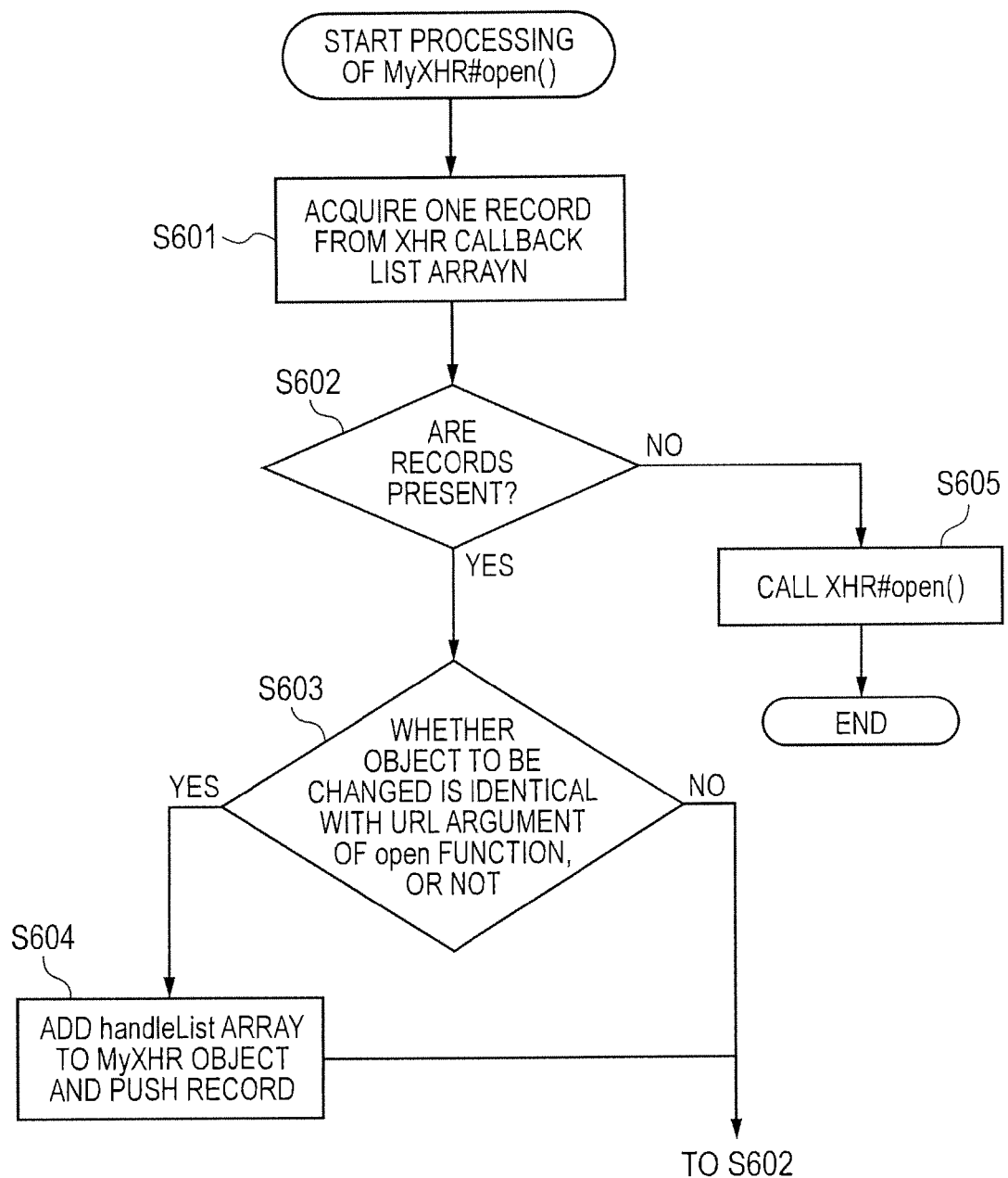

| | PROPERTY NAME | PROPERTY VALUE |
|---|---|---|
| 803 | nitem | 2 |
| 804 | point | 8210 |

| ID | URL | CONTENT | INLINE CONTENT |
|---|---|---|---|
| 00000001 | /index.html | <html>...</html> | 00000002 |
| 00000002 | /uinfo.html | <xml>...</xml> | NULL |
| .. | .. | .. | .. |

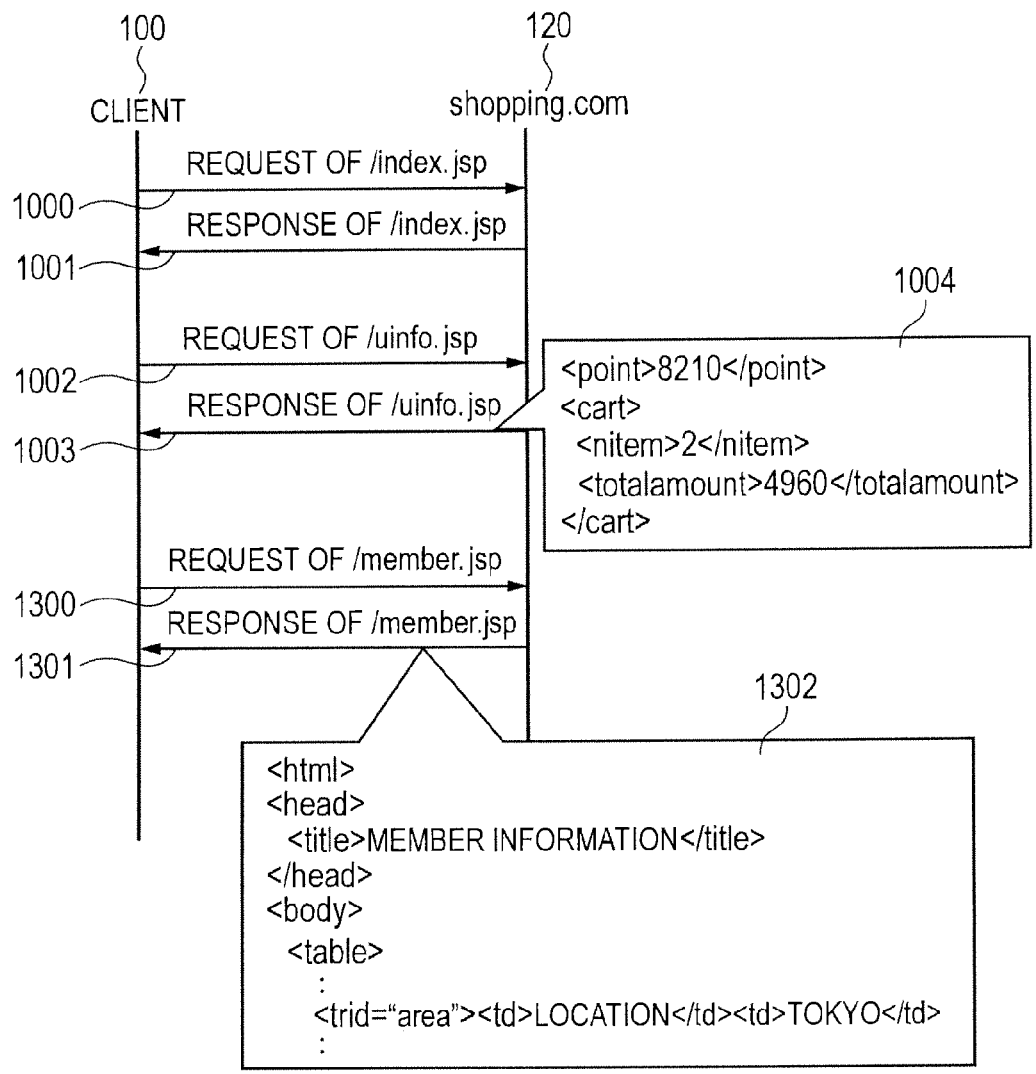

METHOD AND SYSTEM FOR RECORDING OPERATIONS IN A WEB APPLICATION

TECHNICAL FIELD

The present invention relates to a computer system including a client on which a web browser operates, and a server device on which a web application operates, and particularly to a technique in which the operation in web browser by a user who uses a web application is recorded according to the attribute of the user.

BACKGROUND ART

With the popularization of broadband, a variety of servers has been provided with the use of web systems. The construction of a web system can be provided by all of companies because of a price reduction in hardware, web server systems, and package products for service construction. The web application provides not only conventional static screens, but also dynamic screens with the use of a dynamic HTML (hypertext markup language) technique or an Ajax (asynchronous JavaScript+extensible markup language (XML)) technique to improve usability, thus advancing to a trend of differentiation.

On the other hand, distinctive adverse effects of online service arise. When a service is provided face-to-face, how to deal with a client can be changed according to a response of the client. However, in the case of online service, it is difficult to look directly at a face of the client, thereby making it difficult to grasp the response of the client. For that reason, it is difficult to provide a detailed service according to the response of the client.

On the contrary, a technique is disclosed in which the operation of a mouse or a keyboard by the user on the web browser is recorded to grasp a usage status of the service (Patent Literature 3). In the technique of Patent Literature 3, the operation of the mouse and the keyboard of the user on the web browser is recorded, and a script program to be sent to a server is inserted into a response of the web application. In this case, the response represents data for screen creation of the web application, and is described by an HTML language or the like. The inserted script program is deciphered and executed by a script execution engine of the web browser, traps the operation of the mouse and the keyboard by the user on the browser, and records the captured operation as an operation log. A service provider collects and analyzes an operation log so as to grasp where the user has clicked a web page, and where the user has read the web page. Thus, the service provider can investigate a response of the client to the online service, and establish an improvement.

As other related arts, several techniques for capturing a screen of the web application, that is, information from an HTML have been disclosed. As a method of representing a area of a document described in a markup language such as the HTML is, an XPath (XML Path Language) disclosed in Nonpatent Literature 2 has been widely used. There has been widely used a method of representing the area with the use of the XPath, and capturing information from the screen of the web application with the use of an execution engine of the XPath. Also, a method of defining an information extraction rule, and extracting information, by focusing on a table and a list structure of the HTML has been disclosed in Patent Literature 1. Further, a technique in which a script code for recording processing within a client is inserted into a response from the web server in advance to save the record of the processing of the client has been disclosed in Patent Literature 2. A technique of grasping the usage status of the service disclosed above is frequently provided in the configuration of an SaaS (software as a service) or by the existing application in the form of add-on.

CITATION LIST

Patent Literature

Patent Literature 1: Japanese Unexamined Patent Publication No. 2004-062446
Patent Literature 2: Japanese Unexamined Patent Publication No. 2009-104267
Patent Literature 3: US 2008/0046562

Nonpatent Literature

Nonpatent Literature 1: XML Path Language (XPath) 2.0, W3C Recommendation 23 Jan. 2007 http://www.w3.org/TR/xpath20/Abstract and Chapter 1 (Introduction)

SUMMARY OF INVENTION

Technical Problem

In an online business, in order to differentiate one company from other companies, there is a need to precisely analyze the usage status of the online service. For example, there are needs for capturing and analyzing the detailed operation log of the user satisfying specific conditions. As one example of the conditions, there is a case in which the user who puts goods in a shopping cart is to be analyzed in detail with the inclusion of a mouse moving line. This is effective in the analysis on the hypothesis that the user places a mouse cursor over a portion in which the user is interested.

In a usage status visualization technique of the web system representative of Patent literature 3 for the above needs, recording of clicking of buttons or links on the screen, or keyboard input to forms are not problematic in the number of logs. However, if the fine motion of the mouse is also taken, the number of operation logs becomes enormous, and it is difficult to collect the operation logs of all the users.

Accordingly, there is a need to control the acquisition of the operation log such that the operation log of only the users satisfying specific conditions is captured in detail. However, in the related art, semantics at an application level of the HTML are not understood, and information at the application level, such as the user who puts the goods in the shopping cart, cannot be recognized, and it is difficult to control the presence or absence of the operation log acquisition, and the level of detail on the basis of the above information.

In the above description, it is conceivable that profile information on the user is captured from a screen of the web application, and used for determination of the specific conditions, with the use of Nonpatent Literature 1 or Patent Literature 1. However, it is difficult to extract the profile information from the web application in which information within a page is dynamically changed, such as the web application using the dynamic HTML technique or the Ajax technique. This is because the above conventional art can designate a area of the profile information, but cannot directly designate a timing at which the profile information is captured. For that reason, when the page is dynamically rewritten, the profile information cannot be captured, and the control of the operation log acquisition based on the profile information cannot be also conducted.

From the viewpoints of the above-mentioned problems, one object of the present invention is to provide a method and system for recording operation in the web application, which can capture profile information on a user from a screen of a web application, and control a capturing event of the operation log on the basis of that information in a method of recording an operation log of the web application.

Also, another object of the present invention is to provide a method and system for recording operation which can control the capturing event of the operation log even in a web application in which a page is dynamically rewritten, as a result of which an capturing event of the operation log can be controlled on the basis of information on an application layer, and information for improving the application layer can be effectively collected and analyzed.

Solution to Problem

That is, in order to achieve the above object, according to the present invention, there is provided a method of recording operation in a web application, which records an operation log on a web page by a computer having a processing unit, in which a property acquisition definition rule for capturing information from the web page, and a log capturing control definition rule for controlling a recording range of the operation log on the basis of the captured information are provided, and the processing unit executes the steps of: setting an information acquisition event handler of the web page on the basis of the property acquisition definition rule; capturing information from the web page by the information acquisition event handler; controlling the recording range of the operation log on the web page on the basis of the captured information and the log capturing control definition rule; and recording the operation log.

Also, in order to achieve the above object, according to the present invention, there is provided a system for recording operation in a web application, which records an operation log on a web page by a client having a storage unit and a processing unit, in which a property acquisition definition rule for capturing information from the web page, and a log capturing control definition rule for controlling a recording range of the operation log on the basis of the captured information are stored in the storage unit, and the processing unit sets an information acquisition event handler of the web page on the basis of the property acquisition definition rule; captures information from the web page by the information acquisition event handler; and controls the recording range of the operation log on the web page on the basis of the captured information and the log capturing control definition rule.

Advantageous Effects of Invention

According to the present invention, the capturing event of the operation log can be controlled on the basis of the information on the application layer in the web application in which the page is dynamically changed, and the information for improving the web application can be efficiently collected and analyzed.

BRIEF DESCRIPTION OF DRAWINGS

FIG. 1D is a diagram illustrating a configuration example of a log analysis server device according to the first embodiment.

FIG. 1E is a diagram illustrating an example of data of a operation log capturing control definition table according to the first embodiment.

FIG. 1F is a diagram illustrating an example of data of a property capturing definition table according to the first embodiment.

FIG. 6A is a flowchart illustrating an example of processing of an MyXHR#open function of the operation log capturing module in the computer system according to the first embodiment.

FIG. 12 is a diagram illustrating an example of a configuration of a content database in the computer system according to the first embodiment.

FIG. 13 is a diagram illustrating an example of an HTTP communication related to an example of a screen of a web application in a computer system according to a second embodiment.

FIG. 14 is a diagram illustrating an example of data of property information stored in a client storage in the computer system according to the second embodiment.

DESCRIPTION OF EMBODIMENTS

Hereinafter, a variety of embodiments according to the present invention will be described with reference to the drawings. It should be noted that, in the present specification, respective programs to be executed by a processor unit which is a processing unit in a computer system may be expressed as "modules" or "units".

First Embodiment

Figure 1A:
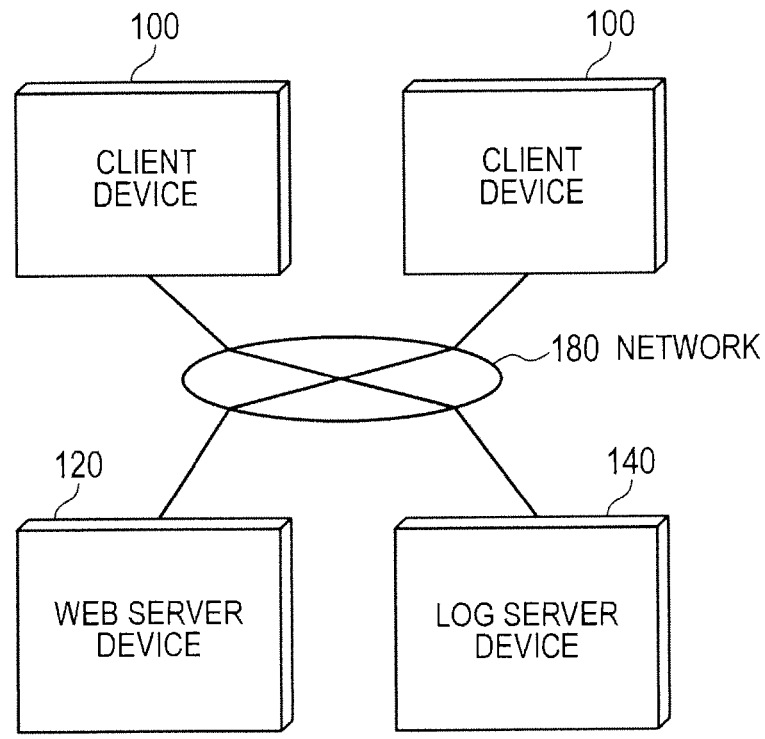
FIG. 1A is a diagram illustrating a system configuration example of a computer system according to a first embodiment.
Figure 1B:
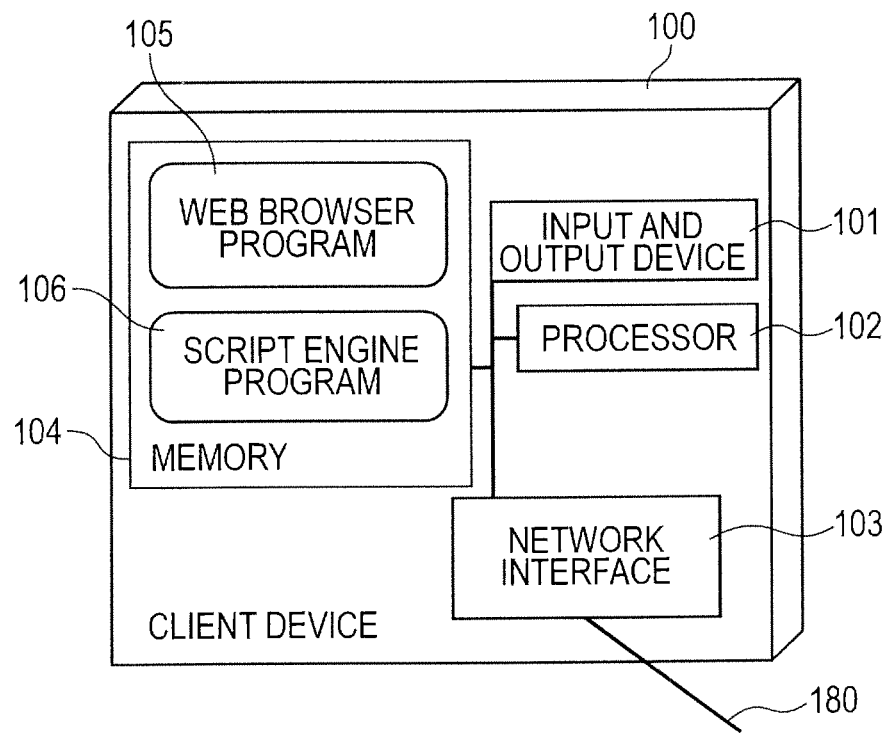
FIG. 1B is a diagram illustrating a configuration example of a client according to the first embodiment.
Figure 1C:
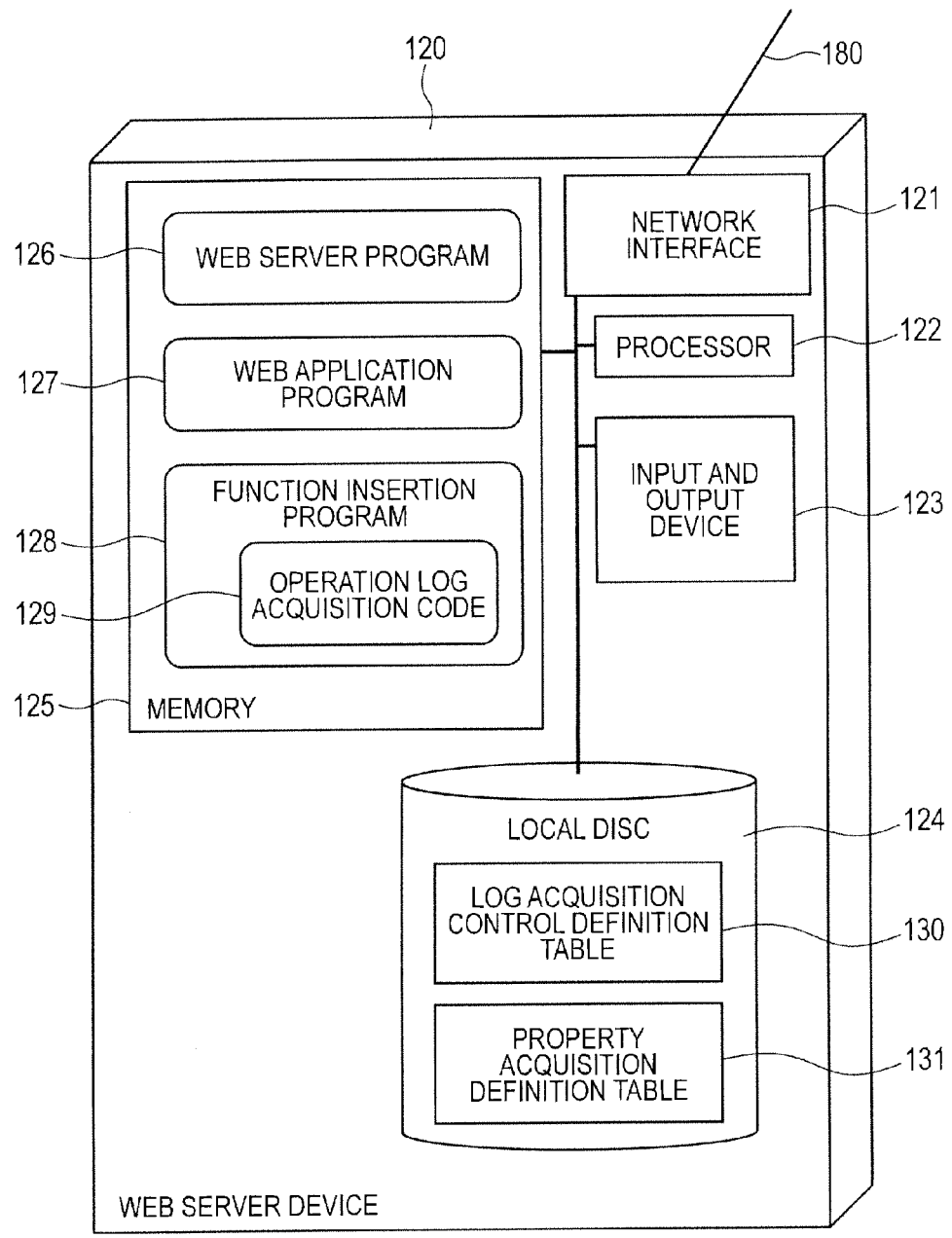
FIG. 1C is a diagram illustrating a configuration example of a web server according to the first embodiment.

Hereinafter, a first embodiment will be described with reference to FIGS. 1A to 10.
<System Configuration>
FIG. 1A is a diagram illustrating a system configuration example of a computer system according to the first embodiment. FIG. 1B is a diagram illustrating a configuration example of a client 100 according to this embodiment. FIG. 1C is a diagram illustrating a configuration example of a web server 120 according to this embodiment. FIG. 1D is a diagram illustrating a configuration example of a log server 140 according to this embodiment.

The computer system illustrated in FIG. 1A includes one or more (two in FIG. 1A) of the clients 100, at least one (one in FIG. 1A) of the web server 120, and at least one (one in FIG. 1A) of the log server 140. The clients 100, the web server 120, and the log server 140 are connected to each other through a network 180. The web server 120 and the log server 140 may be physically mounted on the same device. For that reason, in the present specification, processor units and memories of the respective devices, and further the clients may be generically called "processing unit" or "storage unit".

The client 100 illustrated in FIG. 1B is a computer that uses a web application provided by the web server 120. The client 100 includes an I/O device 101, a processor unit 102 that configures a processing unit, a network interface 103, and a memory 104 that configures a storage unit.

The I/O device 101 is an input device, for example, such as a keyboard or a mouse, which provides a user interface, and an output device, for example, such as a display device. The processor unit 102 executes a web browser program 105, and a script engine program 106, which are stored in the memory 104, and an operating system (operation system: OS) not shown. The network interface 103 is a communication network for allowing the client 100 to communicate data through the network 180. The memory 104 stores programs to be executed by the processor unit 102, and data to be used by those programs therein. The client 100 may further include an external storage device configuring a storage unit not shown.

The web server 120 illustrated in FIG. 1C is a computer that provides the client 100 with a service of applications. The web server 120 includes a network interface 121, a processor unit 122, an I/O device 123, a local storage 124, and a memory 125.

The network interface 121 is a communication network for allowing the web server 120 to communicate data through the network 180. The processor unit 122 executes a web server program 126, a web application program 127, and a module code injection program 128, which are stored in the memory 125. The detailed operation of the respective programs will be described later.

The local storage 124 is a storage device configured by a magnetic disc device or a nonvolatile semiconductor memory, and stores a operation log capturing control definition table 130 that controls an operation log capturing event, and a property capturing definition table 131 that captures attribute information on the user, of the web application program 127 therein. The local storage 124 may be loaded into the web server 120, or be an external storage device disposed on an external of the web server 120. The detailed configurations of the respective tables will be described later.

The I/O device 123 is an input device, for example, such as a keyboard or a mouse, which provides a user interface, and an output device, for example, such as a display device. The web server 120 may not provide the I/O device 123. In this case, the web server 120 is operated by the client 100 or a console terminal not shown. The memory 125 stores programs to be executed by the processor unit 122, and data to be used by those programs therein.

The log server 140 illustrated in FIG. 1D collects and analyzes the operation log of the user in the web application that operates on the web browser of the client 100. The log server 140 includes a network interface 141, a processor unit 142, an I/O device 143, a local storage 144, and a memory 145.

The network interface 141 is a communication interface for allowing the log server 140 to communicate data through the network 180. The processor unit 142 executes a log server program 146 and a log analysis program 147 which are stored in the memory 145. The log analysis program 147 is a storage device configured by a magnetic disc device or a nonvolatile semiconductor memory, and stores an operation log table 148 therein. The local storage 144 may be loaded into the log server 140, or be an external storage device disposed on an external of the log server 140. The operation of the respective programs and the detailed configurations of the respective tables will be described later.

The I/O device 143 is an input device, for example, such as a keyboard or a mouse, which provides a user interface, and an output device, for example, such as a display device. The log analysis server device 140 may not provide the I/O device 143. In this case, the log analysis server device 140 is operated by the client 100 or a console terminal not shown. The memory 145 stores programs to be executed by the processor unit 142, and data to be used by those programs therein.
<Operation Log Capturing Control Definition Table, Property Capturing Definition Table>

FIGS. 1E and 1F are diagrams illustrating examples of the operation log capturing control definition table 130 and the property capturing definition table 131 according to this embodiment, respectively.

The operation log capturing control definition table 130 illustrated in FIG. 1E manages information for controlling a range of the user operation captured by an operation log capturing code 129. In the operation log capturing control definition table 130, a condition expression 160 that defines the condition of the user attribute, and a capturing event 161 that defines the operation log capturing event of the user which meets that condition are managed in association with each other.

The property capturing definition table 131 illustrated in FIG. 1F manages definition information for capturing the attribute of the user from a screen generated by the web application. In the property capturing definition table 131, a property name 170 that is an identifier for describing the captured attribute in the condition expression 160 of the operation log capturing control definition table 130, a source url 171 indicative of an URL of a page from which the attribute is captured, an extract expression 172 that is indicative of where the attribute is included within the page, that is, designates an arbitrary area on the web page, and a change target 173 which is information on an change target, and a capturing timing 174 which is a timing for capturing the designated area, as information for defining an moment of extract, are managed in association with each other. In this embodiment, XPath expression is used as the extract expression. However, any extract expression may be used if the extract expression can define an arbitrary area within the page. For example, a regular expression can be used.

<Outline of Operation of Computer System>

Figure 2:
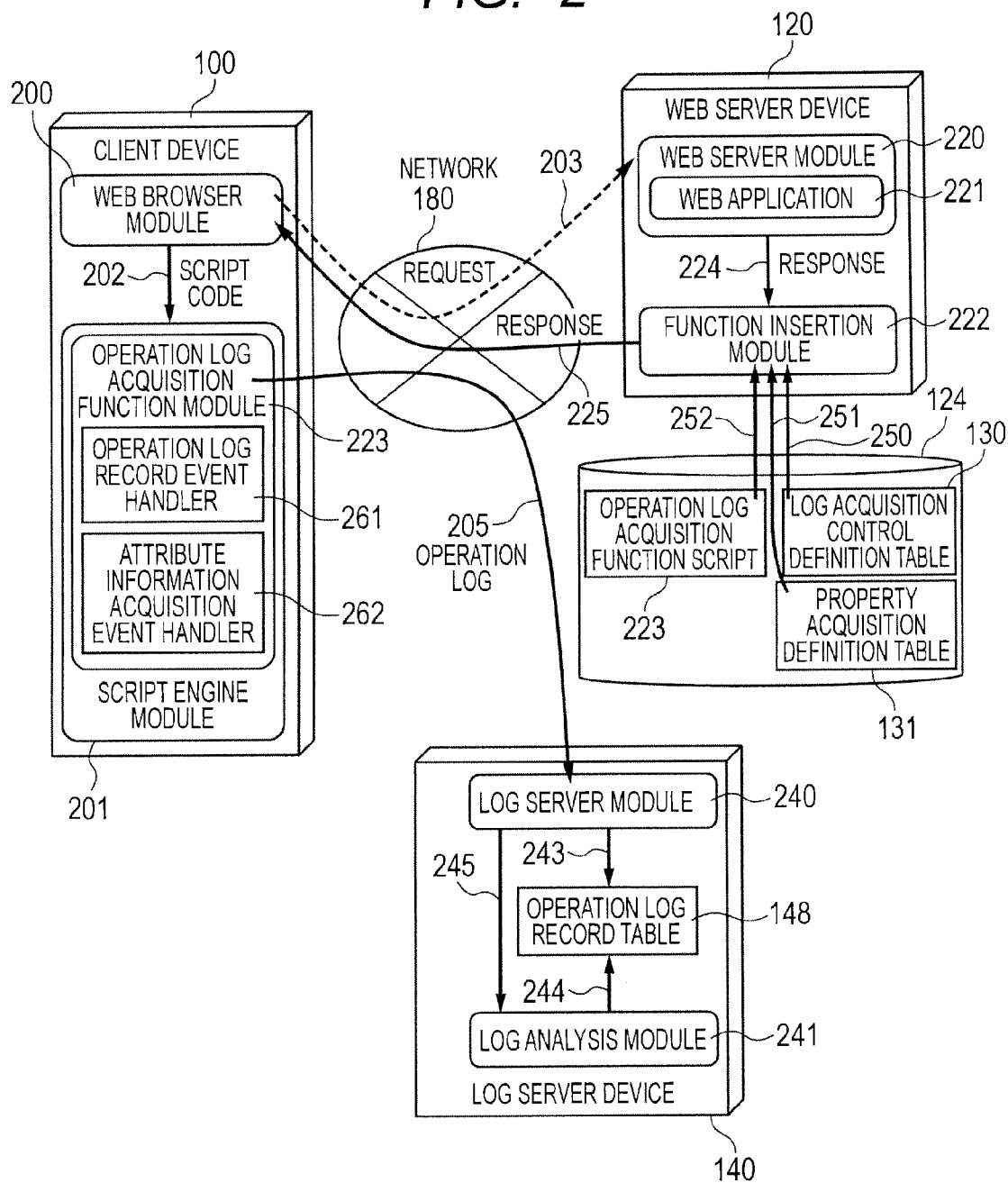
FIG. 2 is a diagram illustrating an outline of the operation of a computer system according to the first embodiment.

FIG. 2 is a diagram illustrating an outline of the operation of the computer system according to this embodiment. In the following description, a state in which the program is loaded into the memory and executed by the processor unit in the respective devices 100, 120, and 140 is expressed as "module".

First, upon accepting the operation of the user for the web browser, a web browser module 200 sends a request 203 corresponding to the operation of the user to a web server module 220. The request 203 is sent in conformity to an HTTP (hyper text transfer protocol) or an HTTPS (hyper text transfer protocol over secure socket layer). The protocol of the request 203 is exemplified by the HTTP or the HTTPS, but not limited to those protocols.

Upon receiving the request 203, the web server module 220 makes a request for processing to a web application 221 corresponding to the received request 203. The web application 221 executes processing corresponding to the request 203 to generate a response 224, and forwards the generated response 224 to a module code injection module 222. The module code injection module 222 extracts an operation log capturing module 223, the operation log capturing control definition table 130, and the property capturing definition table 131 from the local storage 124 according to the forwarded response 224 (250 to 252). Then, the module code injection module 222 generates a response 225 in which the extracted contents are embedded, and sends the generated response 225 to the web browser module 200. Processing for embedding the operation log capturing module 223 is realized with the use of a filtering function of the response provided in the web server 120, such as a ServletFilter function of a J2EE (Java 2 Enterprise Edition: Java is a registered trademark), or an ISAPI (internet server application programming interface) filter function of an IIS (internet information services). In this embodiment, the operation log capturing module 223 is dynamically embedded by the module code injection module 222. Alternatively, the operation log capturing module 223 may be embedded in the web application 221 9 with no use of the module code injection module 222 in advance.

The operation log capturing module 223 may be embedded with the use of a proxy server device making an HTTP communication intermediating between the clients and the web server. The proxy server device can be configured by any system of a forward proxy located on the client side and a reverse proxy located on the server device side.

Upon receiving the response 225 from the module code injection module 222, the web browser module 200 deciphers the HTML (hyper text markup language) data in the received response 225, and displays the data on the web browser. Also, the web browser module 200 forwards the operation log capturing module 223 embedded in the response 225 to a script engine module 201 (202). Thereafter, after the operation log capturing module 223 has executed the initialization of an operation log capturing event handler 261 and an attribute information capturing event handler 262, the operation log capturing module 223 sequentially captures the user operation on the web browser of the client 100 as the operation log.

In this example, the operation log capturing event handler 261 is an event handler function for trapping and recording the user operation on the web browser. Also, the attribute information capturing event handler 262 is an event handler function for capturing the attribute information of the user from response information of the web application. The details will be described later.

If page movement occurs in the web browser, the operation log capturing module 223 sends an operation log 205 recorded by the operation log capturing module 223 to a log server module 240 of the log server 140. The page movement may be associated with a communication through the network, or may not be associated therewith. The latter case not associated with the communication is when the page is rewritten on the web browser side with the use of a DOM (document object model) or JavaScript (registered trademark) technique. The operation log transmission at the timing of the page movement is exemplary, and the operation log may be sent at another timing, for example, at regular time intervals or for each given amount of operation log.

After receiving the operation log 205 from the operation log capturing module 223, the log server module 240 sequentially stores the received operation log 205 in the operation log table 148 (243).

A log analysis module 241 analyzes the user operation on the basis of data stored in the operation log table 148, and generates visualization data. The processing of the log analysis module 241 is executed by an instruction from a manager user, or batch processing at an arbitrary timing.

<Module Configuration Example of Log Server 140>

Figure 3:
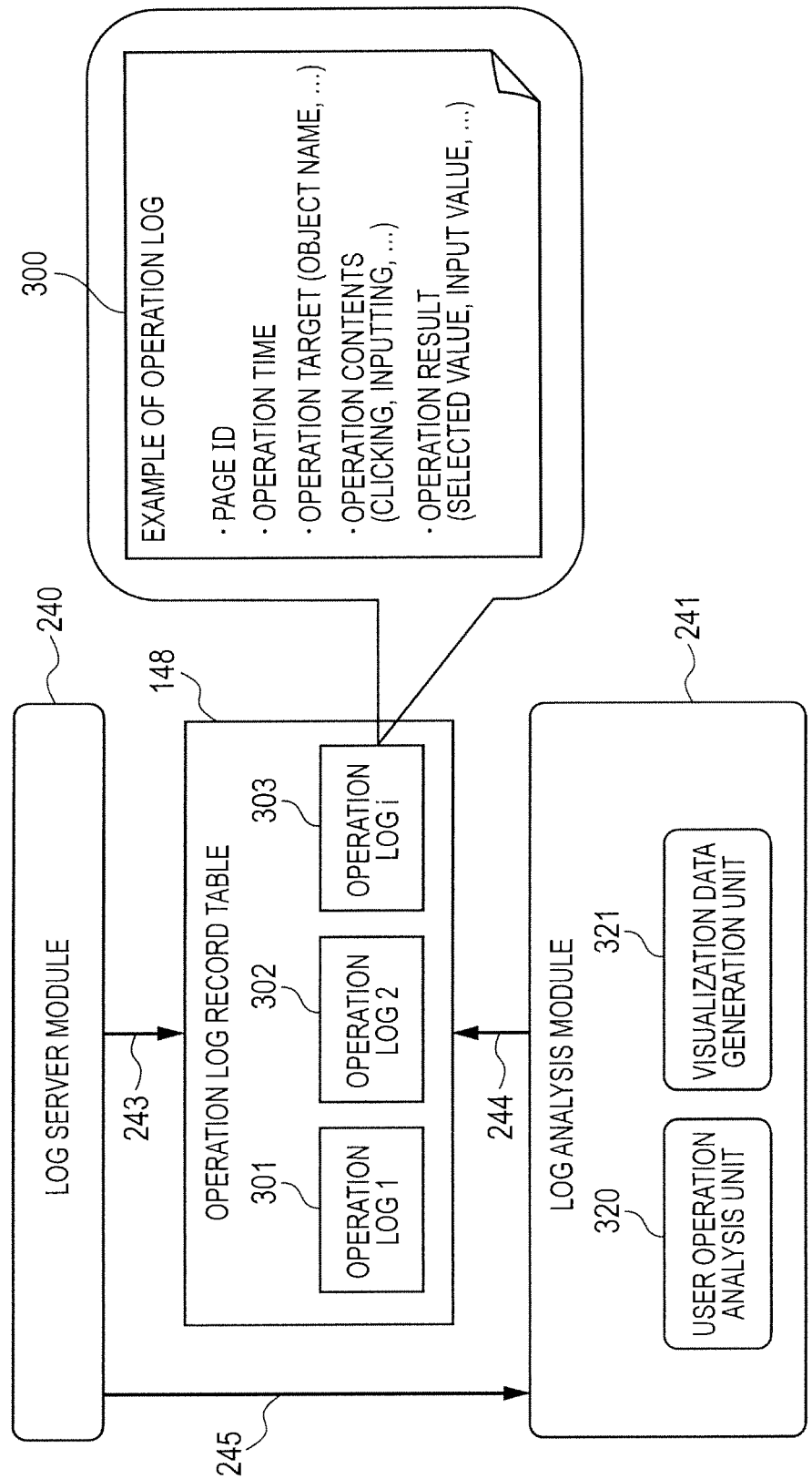
FIG. 3 is a diagram illustrating a module configuration example of the log analysis server device according to the first embodiment.

FIG. 3 is a diagram illustrating a module configuration example of the log server 140 according to this embodiment. Also, FIG. 3 illustrates operation logs 301, 302, and 303 saved in the operation log table 148, and an example 300 of the operation log. The operation logs 301, 302, and 303 are saved in the operation log table 148. If there is no need to distinguish the operation logs 301, 302, and 303 from each other, those operation logs are expressed as operation logs 300. The operation log 300 corresponds to the operation log 205 illustrated in FIG. 2.

Each of the operation log 300 includes a page-ID which is an identifier of the page on which the operation log is recorded, an time of operation which is a time at which the user operates on the page specified by the page-ID, an operation target such as an object name which is an object to be operated by the user, kind of operations such as mousing, clicking, or inputting which are contents of the operation of the user, a selected value which is a result of the operation of the user, and an operation result such as an input value. Thus, a plurality of operation logs 300 is saved in the operation log table 148. In the user operation on the page, the operation status within the page has only to be analyzed, and all of the items do not always need to be recorded. For example, when attention is paid to only the number of clicks, the click has only to be recorded as the kind of operation.

The log analysis module 241 includes a user operation analysis module 320, and a visualization data generation module 321. The user operation analysis module 320 analyzes the operation of the user such as a travel of the mouse, the click of the mouse, or an input to the Form on the web browser for each page. The visualization data generation module 321 generates and outputs the visualization data of the analysis result by the user operation analysis module 320. In this case, "output" represents generation of data to be output in the form of a table or to be displayed in an overlay display format on the screen of the web application.

<System Operation Example>

Figure 4A:
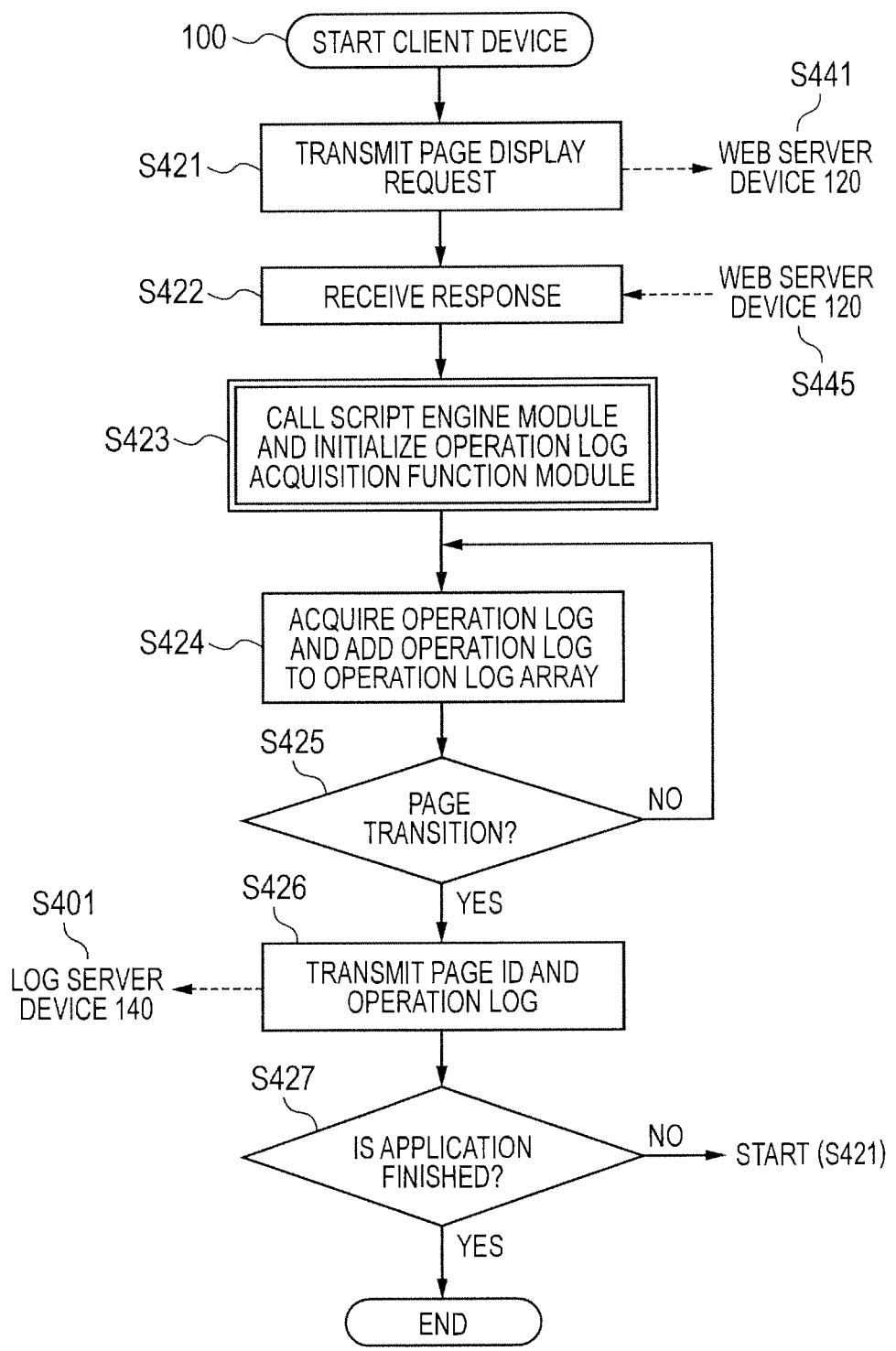
FIG. 4A is a flowchart illustrating an example of operation of the client in the computer system according to the first embodiment.
Figure 4B:
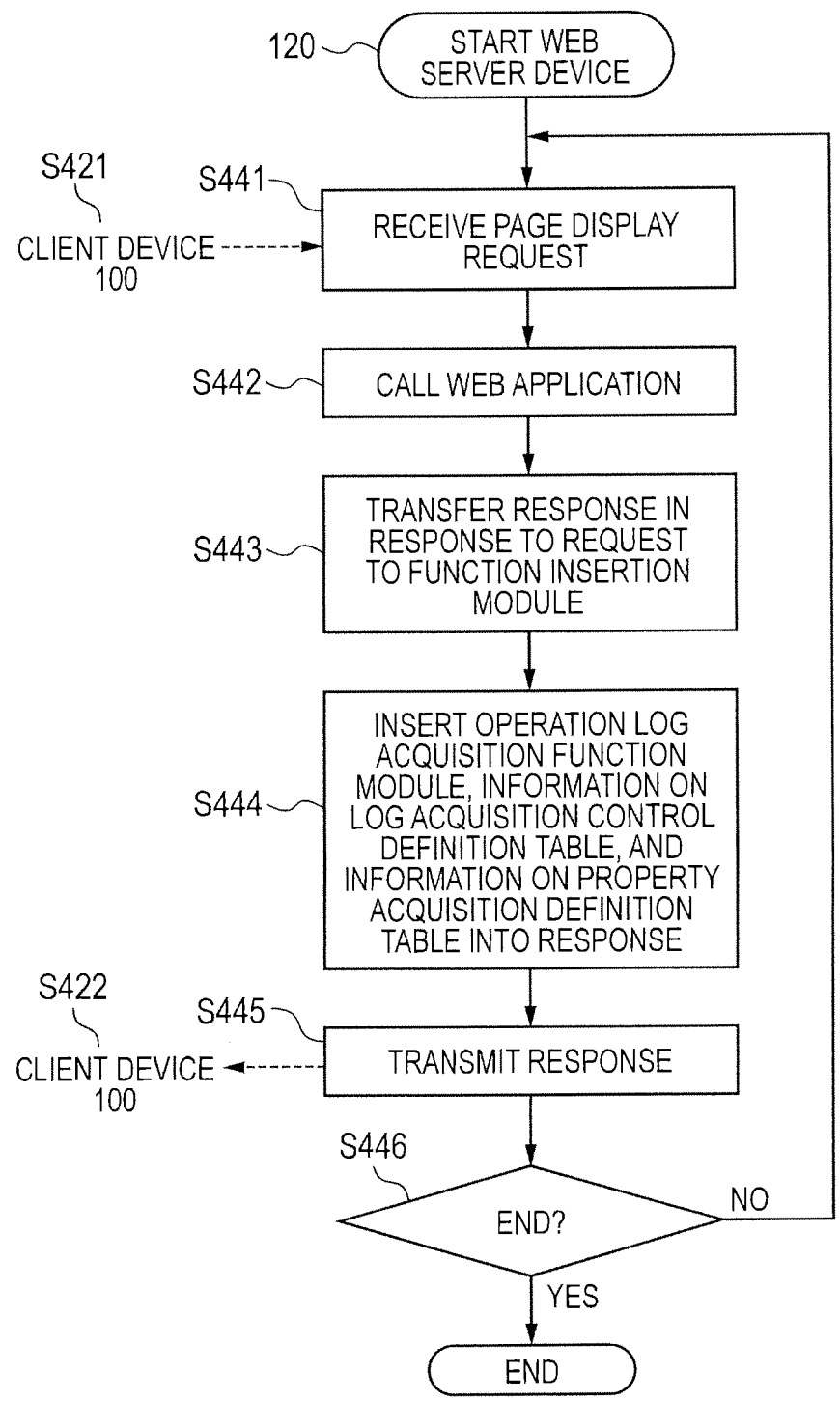
FIG. 4B is a flowchart illustrating an example of operation of the web server in the computer system according to the first embodiment.
Figure 4C:
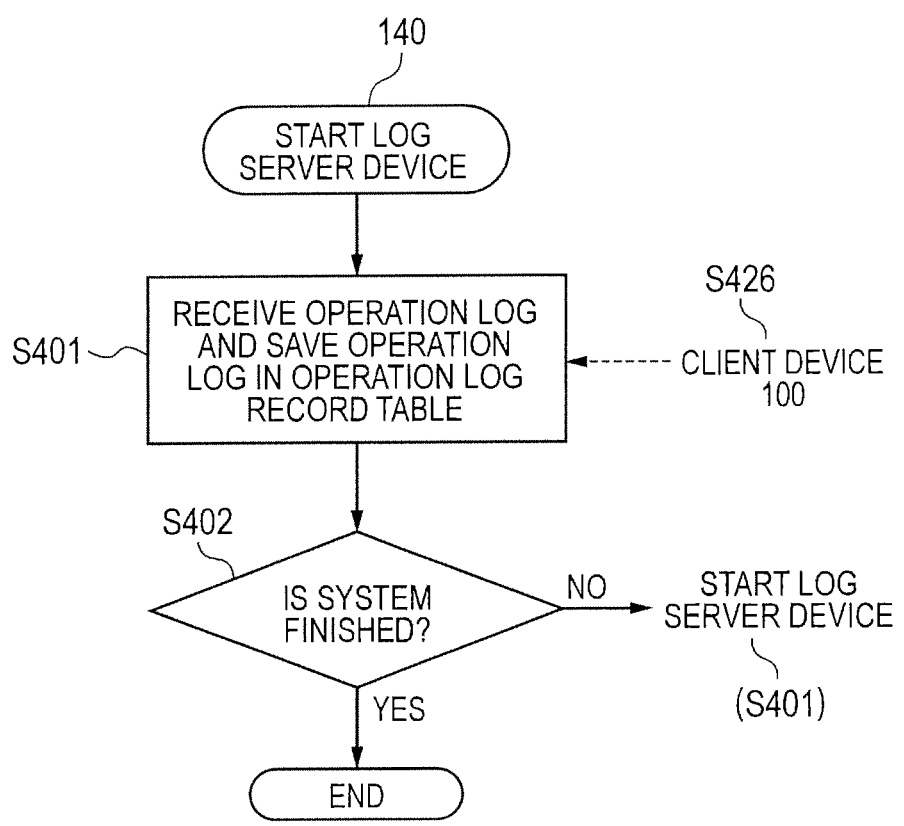
FIG. 4C is a flowchart illustrating an example of operation of the log analysis server device in the computer system according to the first embodiment.

FIG. 4A is a flowchart illustrating an example of operation of the client 100 in the computer system according to this embodiment. FIG. 4B is a flowchart illustrating an example of operation of the web server 120 in the computer system according to this embodiment. FIG. 4C is a flowchart illustrating an example of operation of the log analysis server device 140 in the computer system according to this embodiment. Hereinafter, a flow of processing will be described with reference to FIGS. 4A to 4C.

First, in FIG. 4A, the web browser module 200 sends a page request of the web page to the web server 120 (S421). Upon receiving the page request from the client 100 (S441), the web server module 220 invokes the web application 221 responsive to the page request (S442). Then, the web application 221 executes processing in response to the page request received in Step S441 to generate a response, and forwards the generated response to the module code injection module 222 (S443).

Thereafter, the module code injection module 222 inserts the operation log capturing module 223, information on the operation log capturing control definition table, and information on the property capturing definition table into the forwarded response (S444). In this example, in the information of the property capturing definition table to be inserted, only the record in which the request URL included in the page request from the client 100 meets the source url 171 is inserted.

The processing in Step S444 can be realized by using a filtering function of the response provided in the web server 120 such as the above-mentioned ServletFilter of J2EE. The processing from Step 443 to Step 445 may be inserted into the response by using the proxy device in addition to a case using the filtering function of the response provided in the web server 120.

Upon receiving the response from the web server 120 (S422), the web browser module 200 calls the script engine module 201, and initializes the operation log capturing module 223 (S423). Also, in the initialization process in Step S423, the web browser module 200 sets the operation log capturing event handler 261 that monitors the event of the operation of the user on the web browser module 200. The initialization process (S423) of the operation log capturing module 223 will be described in detail later.

Subsequently, the operation log capturing module 223 captures the operation of the user on the web browser module 200 as the log data of operation, and appends the log data to a primarily recorded array on the web browser module 200 (S424). The processing in Step S424 is repeated until the event of the page movement occurs (S425).

If the event of the page movement occurs (yes in S425), the operation log capturing module 223 sends the page-ID and the operation log 300 to the log server 140 (S426). The processing from the above Step S421 to Step 426 by the client 100 is continued until the web application that operates on the client 100 is finished (S427).

In this embodiment, the operation logs are put together on the page basis, and the put-together logs are sent to the log server 140. Alternatively, the log may be sent every time the log is captured, or the operation log may be collectively sent on another basis.

The log server module 240 of the log server 140 receives the operation log from the client 100, and saves the received operation log in the operation log table 148 (S401). The log server 140 continues the processing until the operation is finished (S402).

<Example of Initialization of Operation Log Capturing Module>

Figure 5:
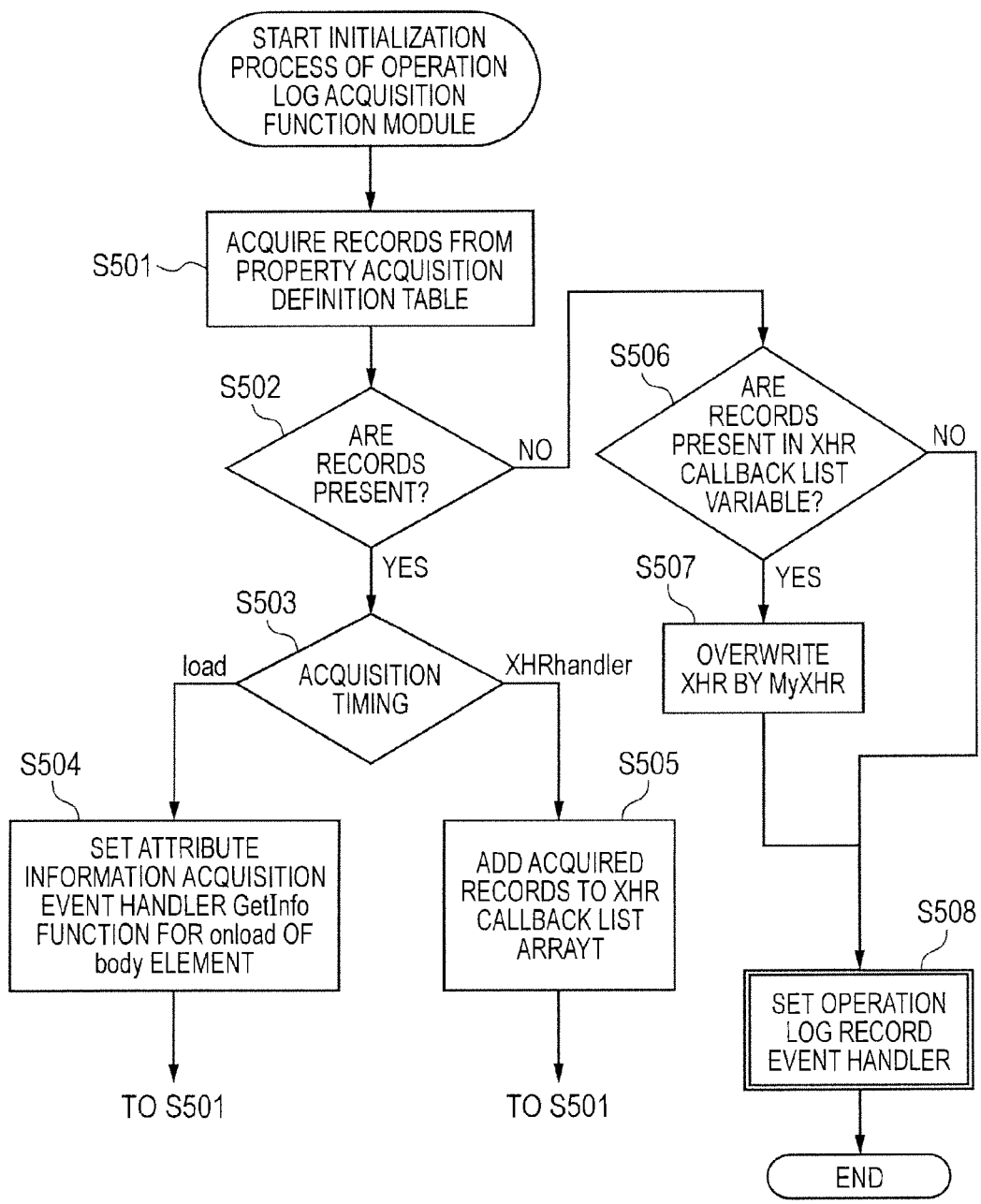
FIG. 5 is a flowchart illustrating an example of an initialization process of an operation log capturing module in the computer system according to the first embodiment.

FIG. 5 is a flowchart illustrating an example of the initialization process (S423) of the operation log capturing module 223 in the computer system according to this embodiment. In the initialization process, an event handler for capturing the attribute information is set with reference to the received property acquisition definition information. If the capturing timing is load, the event handler is set for an onload event of the body element to call a GetInfo function which is an attribute information capturing event handler function. Also, if the capturing timing is XHRhandler indicative of dynamic rewrite using XmlHttpRequest, the event handler is set to call the GetInfo function which is the attribute information capturing event handler function after finishing the processing of the receive callback function of the XmlHttpRequest (hereinafter abbreviated as "XHR") object. That is, the event handler is rewritten to call the information acquisition even handler after completing the receive handler process responsive to the request different from the request of the top frame of the web page.

Hereinafter, the initialization process will be described with reference to FIG. 5. Records are sequentially captured from the first received property capturing definition table (S501, S502), and processing from Step S503 to Step S505 is conducted. If the capturing timing (S503) of the property acquisition definition is load, an attribute information capturing event handler GetInfo function is set for the onload of the body element (S504). On the other hand, if the capturing timing (S503) of the property acquisition definition is XHRhandler, in order to implement the processing of the attribute information capturing event handler GetInfo function after the processing to be executed after the XHR has been received has been finished, the captured records are appended to the XHR callback list array (S505).

After the processing of all the property capturing definition tables has been completed (no in S502), the processing from Step S506 to Step S508 is executed. If the records are stored in the XHR callback list array (yes in S506), the XHR object is overridden by the MyXHR object (S507). The override function is an open function (MyXHR#open function) described in FIG. 6A, and a send function (MyXHR#send function) described in FIG. 6B. Finally, the operation log capturing event handler is set (S508). In this processing, the operation log capturing event handler is set according to the log capturing control definition, and its details will be described with reference to FIG. 7 later.

In the above processing example, an example of an asynchronous communication using the XHR is described as an example of dynamic rewrite. As other asynchronous communication techniques, JSONP (JavaScript Object Notation with Padding) or hidden frames are used. In the case of the JSONP, in S504, the attribute information capturing event handler function GetInfo is set for the onload or onreadystatechange event of the script tag used in the JSONP. On the other hand, in the case of the hidden frames, the attribute information capturing event handler function GetInfo is set for the onload event of the frame element used in the hidden frames. When the asynchronous communication using the iframe is conducted, the attribute information capturing event handler function GetInfo is set for the onload event of the iframe element.

Also, as an example of the dynamic rewrite other than the above asynchronous communication, a technique in which an input auxiliary window is opened from a window of a main browser separately, and an input decision value in the auxiliary window is reflected on the main window is also frequently used. In this case, the event handler is set to call the attribute information capturing event handler function GetInfo after the processing of the event handler on the operation which is an input decision of the auxiliary window has been terminated. That is, the event handler is rewritten to call the information acquisition event handler after completing the processing in another window which is different from the event handler for the main window of the web application.

<Example of XHR Overwrite>

FIG. 6A is a flowchart illustrating an example of processing of an MyXHR#open function of the operation log capturing module in the computer system according to this embodiment. In the open function, an URL delivered as an argument is confirmed, and if the URL is an URL to be subjected to attribute information acquisition with reference to the property acquisition definition, the URL is temporarily recorded in advance so as to be prepared for setting the GetInfo function which is the attribute information capturing event handler function when calling the send function which will be described later.

Hereinafter, the open processing will be described with reference to FIG. 6A. First, records are sequentially captured from an XHR callback list array (S601, S602), and processing from Step S603 to Step S604 is conducted. It is confirmed whether an change target in each record is identical with a URL argument of the open function, or not (S603), and if identical, a handleList array is appended to the MyXHR object, and this record is pushed to the array (S604). If the handleList is present in the MyXHR object, only push of the record is conducted. After the processing of all the records has been completed, the open function of the XHR object which is an original object is called (S605).

Figure 6B:
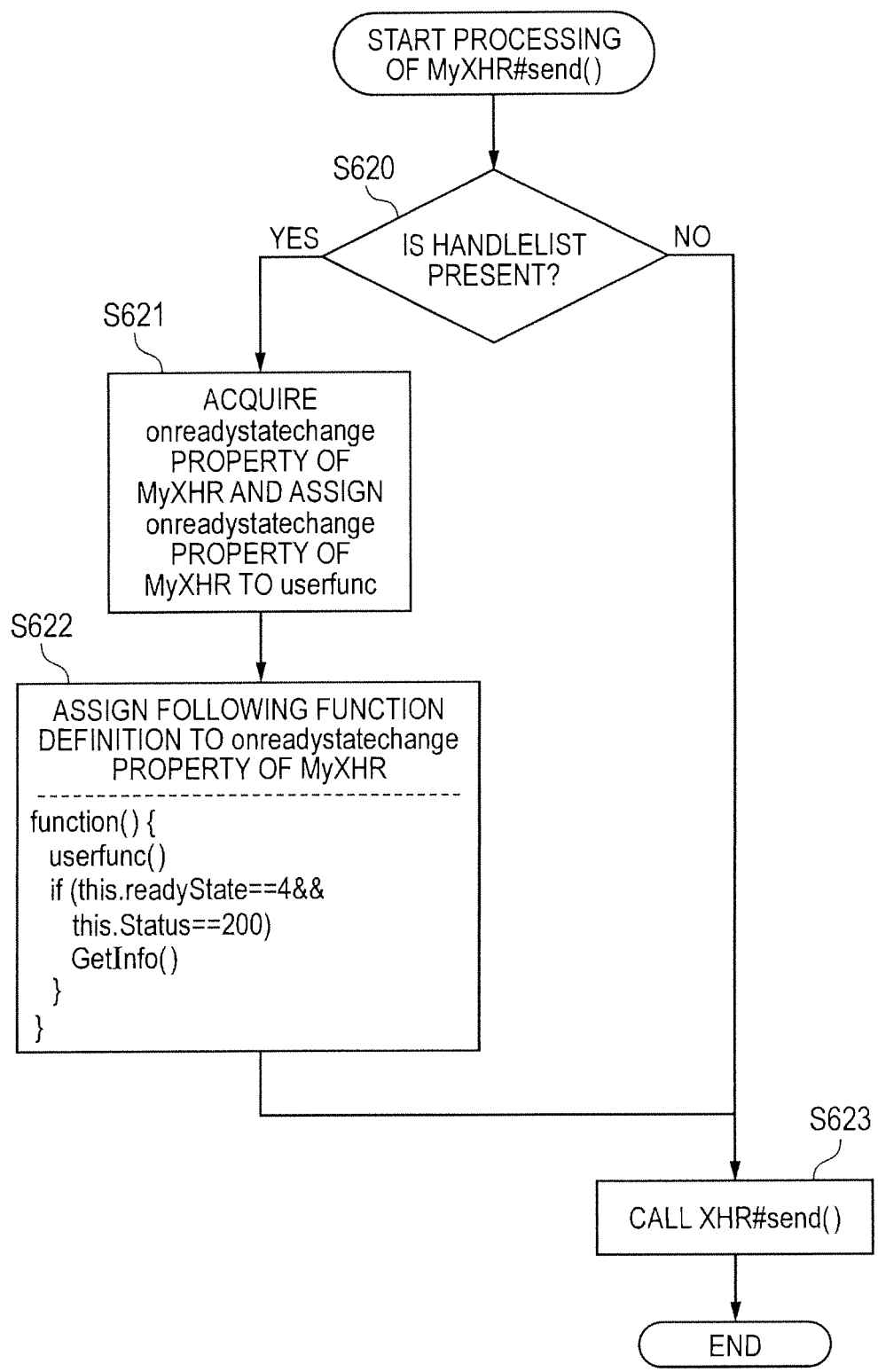
FIG. 6B is a flowchart illustrating an example of processing of an MyXHR#send function of the operation log capturing module in the computer system according to the first embodiment.

FIG. 6B is a flowchart illustrating an example of processing of an MyXHR#send function of the operation log capturing module in the computer system according to this embodiment. In the send function, the attribute information capturing event handler GetInfo function is set with reference to the handleList set in the open function. In this processing, the callback function of the XHR set by the web application is captured from an onreadystatechange property of the MyXHR object (S621). The onreadystatechange property is redefined so as to call the attribute information capturing event handler GetInfo function after the receive completion processing using the callback function of the web application has been finished (S622). Finally, the send function of the XHR object which is the original object is called (S623). The onload property may be used instead of the onreadystatechange depending on the implementation of the browser. In this case, an appropriate property is referred to after the type of browser has been determined.

Figure 6C:
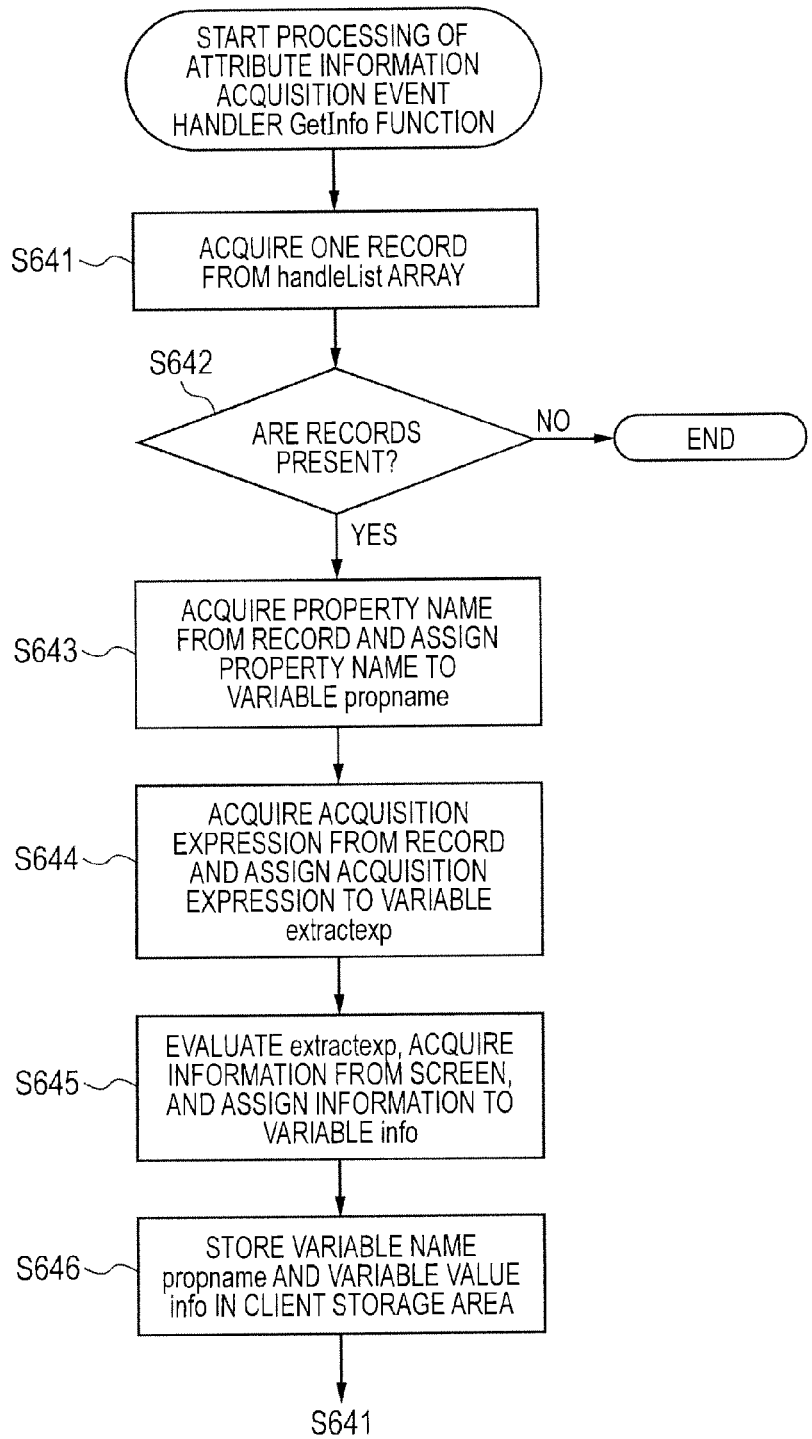
FIG. 6C is a flowchart illustrating an example of processing of a GetInfo function which is an attribute information capturing event handler function of the operation log capturing module in the computer system according to the first embodiment.

FIG. 6C is a flowchart illustrating an example of processing of the GetInfo function which is the attribute information capturing event handler 262 of the operation log capturing module in the computer system according to this embodiment. In this processing, an extract expression for capturing the property information is applied from the screen with reference to the handleList array that stores the information on the property acquisition definition, and the property information is captured, and stored in a client storage. Hereinafter, the processing of the GetInfo function will be described with reference to FIG. 6C. In this processing, records are sequentially captured from the handleList array, and the processing from Step S643 to Step S646 is conducted. First, a property name is captured from each record, and set to a variable propname (S653). Then, an extract expression is captured from the record, and set to a variable extractexp (S644). Then, the extract expression extractexp is evaluated, and information is captured from the screen, and set to the variable info (S645). In this example, in the evaluation of the extract expression, there can be implemented any module that can evaluate the XPath such as an execution engine of the XPath installed in the web browser program 105.

Then, a variable name propname and a variable value info are stored in the client storage (S646). In this example, the client storage is a storage area in the client 100 which can be accessed from a script program that operates on the web browser program 105. Any technique may be used for the client storage if the area can be accessed from the script language, such as a variable of the script language, HTTP Cookie, or the UserData area of the Internext Explore™ made by Microsoft, or a local storage function of the HTML5. Also, the client storage may be saved in a server side by communicating with the server. When data is saved, the data may be encrypted taking privacy into consideration. Any system may be used for encryption if the system can protect the data, such as independent encryption, a symmetric key cryptography system, or a public key cryptography system. Also, as the attribute information, specific data per se of the user may not be recorded, but abstracted information such as segmented classification may be provided. The segmenting can be realized by managing information for segmentation on the server side, and forwarding the information to the web browser module 200 as with the operation log capturing control definition table 130 or the property capturing definition table 131. With the abstracted attribute information, the profile information on the user can be recorded giving more consideration to privacy.

Figures 8, 9:
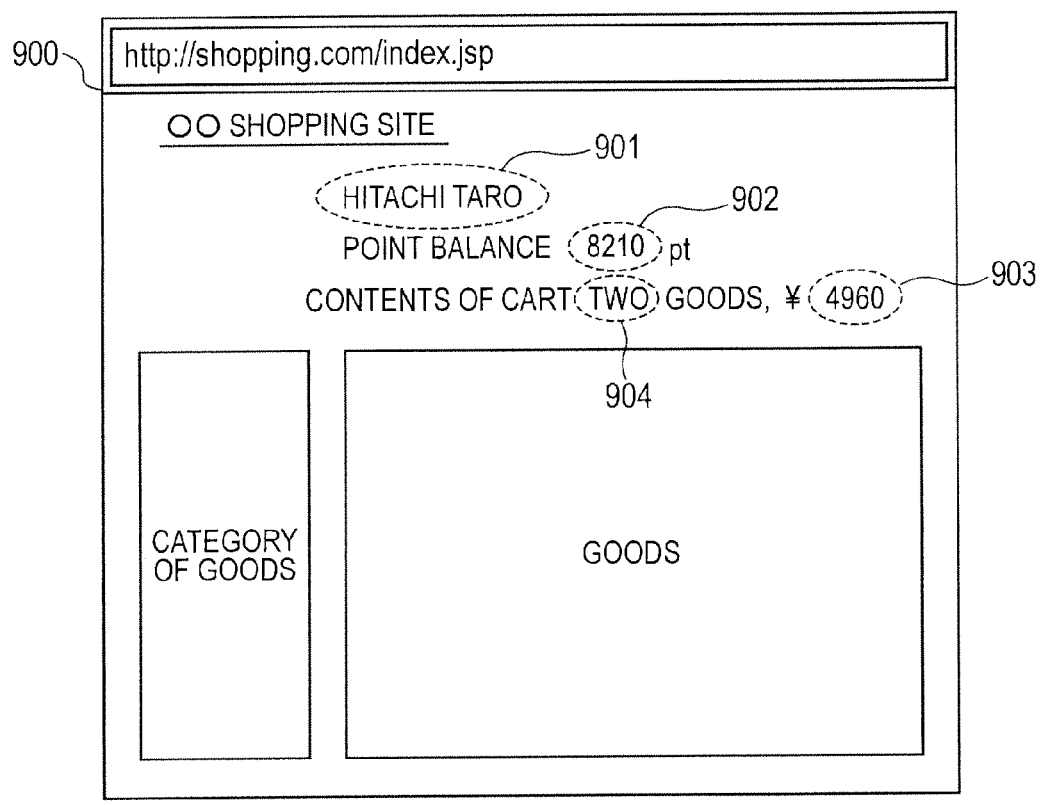
FIG. 8 is a diagram illustrating an example of data of property information stored in a client storage in the computer system according to the first embodiment.
FIG. 9 is a diagram illustrating an example of a screen of a web application in the computer system according to the first embodiment.

FIG. 8 illustrates an example of the property information stored in the client storage. As illustrated in FIG. 8, the property information on the user is stored as a set of a property name 801 and a property value 802. In this example, properties that nitem is 2 (803), and point is 8210 (804) are stored.

<Processing Example of Operation Log Capturing Event Handler Setting>

Figure 7:
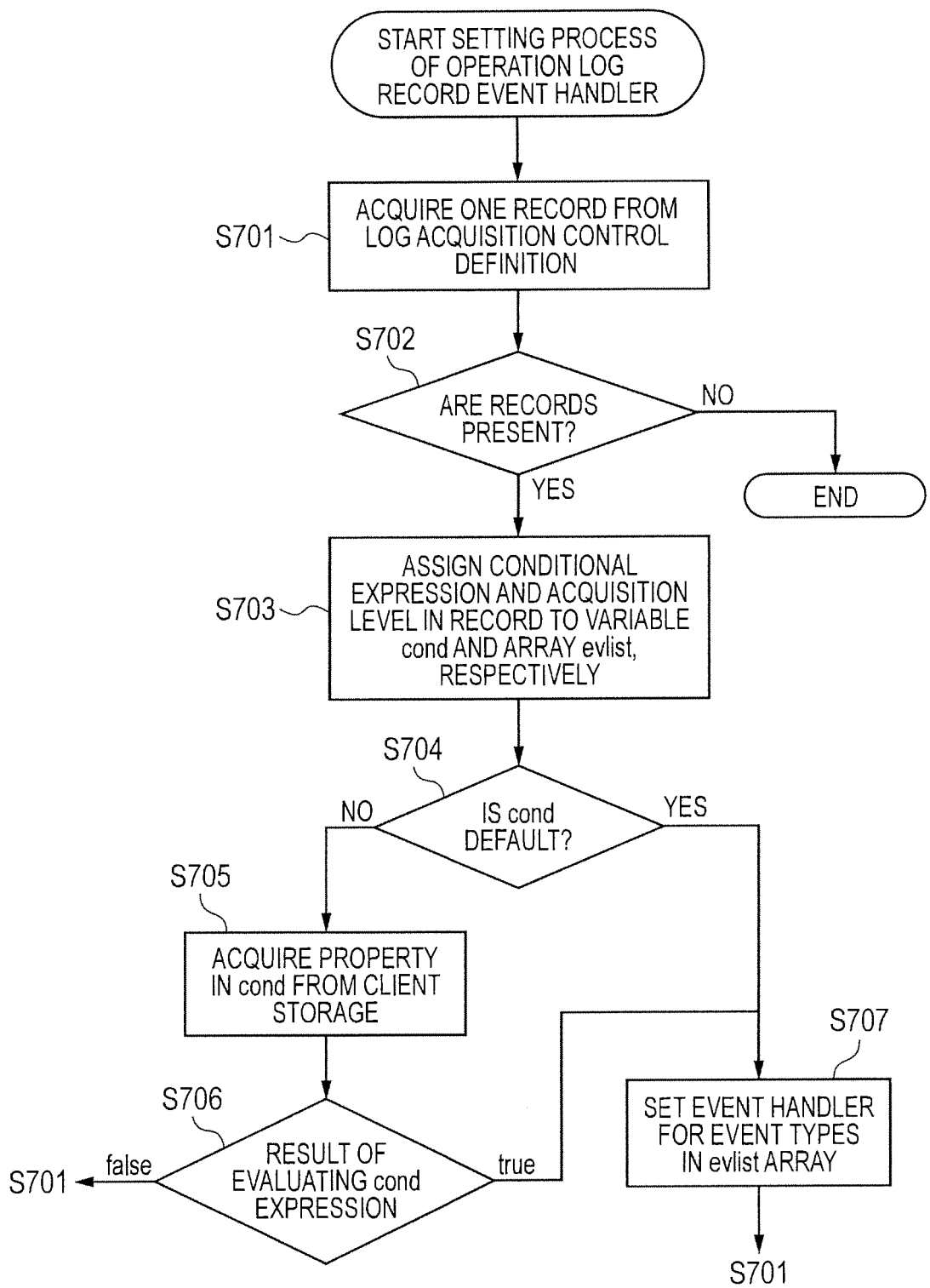
FIG. 7 is a flowchart illustrating an example of an operation log capturing event handler setting process of the operation log capturing module in the computer system according to the first embodiment.

FIG. 7 is a flowchart illustrating an example of a setting process (S508) of the operation log capturing module in the computer system according to this embodiment. In this processing, the log record event handler is set with reference to the log capturing control definition and the property information stored in the client storage. Hereinafter, a description will be given of an operation log capturing event handler setting process with reference to FIG. 7. In this processing, definition records are sequentially captured from the log capturing control definition, and processing from Step S703 to Step S707 is conducted. First, a condition expression and an capturing event are captured from the record, and set to a variable cond and an array evlist (S703). If a value of cond is DEFAULT, the event handler is set for the respective event types in the evlist array. In the case of FIG. 1E, the event handler that captures the operation log related to form, click, and scroll is set. If cond is not DEFAULT, the property appearing in a cond expression is captured from the client storage (S705). Then, the cond expression is evaluated (S706). If the result of evaluation is true, the event handler is set in Step S707. If a record 162 in FIG. 1E becomes true, the event hander that captures the operation log related to mouse, form, click, and scroll are set. If the result of evaluation is false, the flow is returned to Step S701, and a subsequent record is evaluated. In this embodiment, setting of the operation log capturing event handler is implemented at a timing of the initialization process of the operation log capturing module 223, but may be implemented at the timing of the attribute information change by the GetInfo function.

Figure 10:
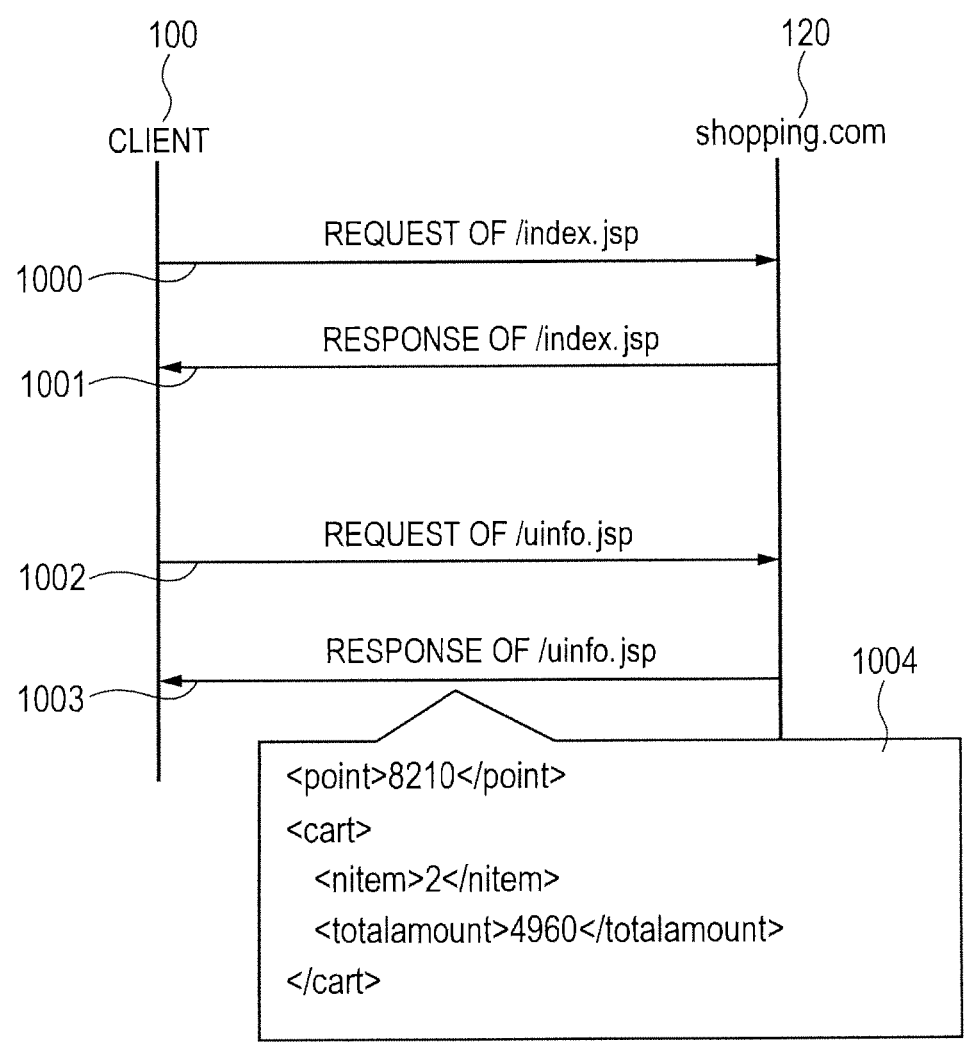
FIG. 10 is a diagram illustrating an example of an HTTP communication related to the example of the screen of the web application in the computer system according to the first embodiment.

FIG. 9 is a diagram illustrating an example of a screen of a web application in the computer system according to this embodiment. Also, FIG. 10 is a diagram illustrating an example of the HTTP communication for generating the example of the screen illustrated in FIG. 9. In this screen example, "Hitachi Taro" indicated by reference numeral 901 is information included in a response (1001) of index.jsp, and "8210", "2", and "4960" indicated by reference numeral 902, 903, and 904, respectively, are information included in a response (1003) of unifo.jsp. It is assumed that "8210", "2", and "4960" are realized by calling info.jsp from the index.jsp screen with the use of the XHR, dynamically capturing the information, and rewriting the screen (1002, 1003, and 1004 in FIG. 10).

In this application, in the condition expression 162 of FIG. 1E, if a point balance is 5000 or higher, and the number of goods stored in the cart is 1 or higher, a definition example that records the details including the motion of the mouse is represented (162). Also, FIG. 1F is a definition extracting the user name as name (175), the point balance as point (176), the number of items stored in the cart as nitem (177), and the area of the user as area (178). In this example, in the case of the user that obtains the screen illustrated in FIG. 9, since the definition corresponds to the condition expression 162, the operation log including the motion of the mouse is recorded in detail. This example shows that when it is assumed that the user who is liable to make a purchase has the point balance of 5000 points or higher, and stores the goods in the shopping cart, the operation logs of the user that matches this condition are collected and analyzed in detail. Accordingly, the capturing event of the operation log can be controlled according to the attribute of the user, and the logs can be effectively collected.

<Setting Example of Property Acquisition Definition>

A description will be given of a setting method of the property capturing definition table 131 which is definition information for capturing the user attribute from the screen which is generated by the web application. If asynchronous communication such as the XHR and the JSONP is mixed together, it is difficult to set the capturing timing. Under the circumstances, a method of supporting the setting of the property acquisition definition will be described with reference to FIGS. 11 and 12.

A rough flow of the setting support method will be described below. The manager user who conducts the setting operates the web application as normal. The web server 120 receives the HTTP request as normal. The web server 120 saves the response contents of the web application in a content database which is newly provided, after the operation log capturing module 223 has been inserted into the response (S444). This function is realized by the provision of the property acquisition definition function in the module code injection module 222. If the content database can be accessed from the web server 120, the content database may be integrated, or may be driven by another device.

The operation log capturing module 223 is newly provided with a function of receiving the selection of the area within the web page, which is the profile information, from the manager user, and sending the received area to the web server 120. If the manager user selects the area of the profile information from the screen of the web application, the property acquisition definition function within the module code injection module 222 searches on the basis of which content information the appropriate area is generated with reference to the content database. The property acquisition definition function within the module code injection module 222 estimates the capturing timing on the basis of the information on in which content the appropriate area is included, and appends the definition information to the property capturing definition table 131.

Figure 11:
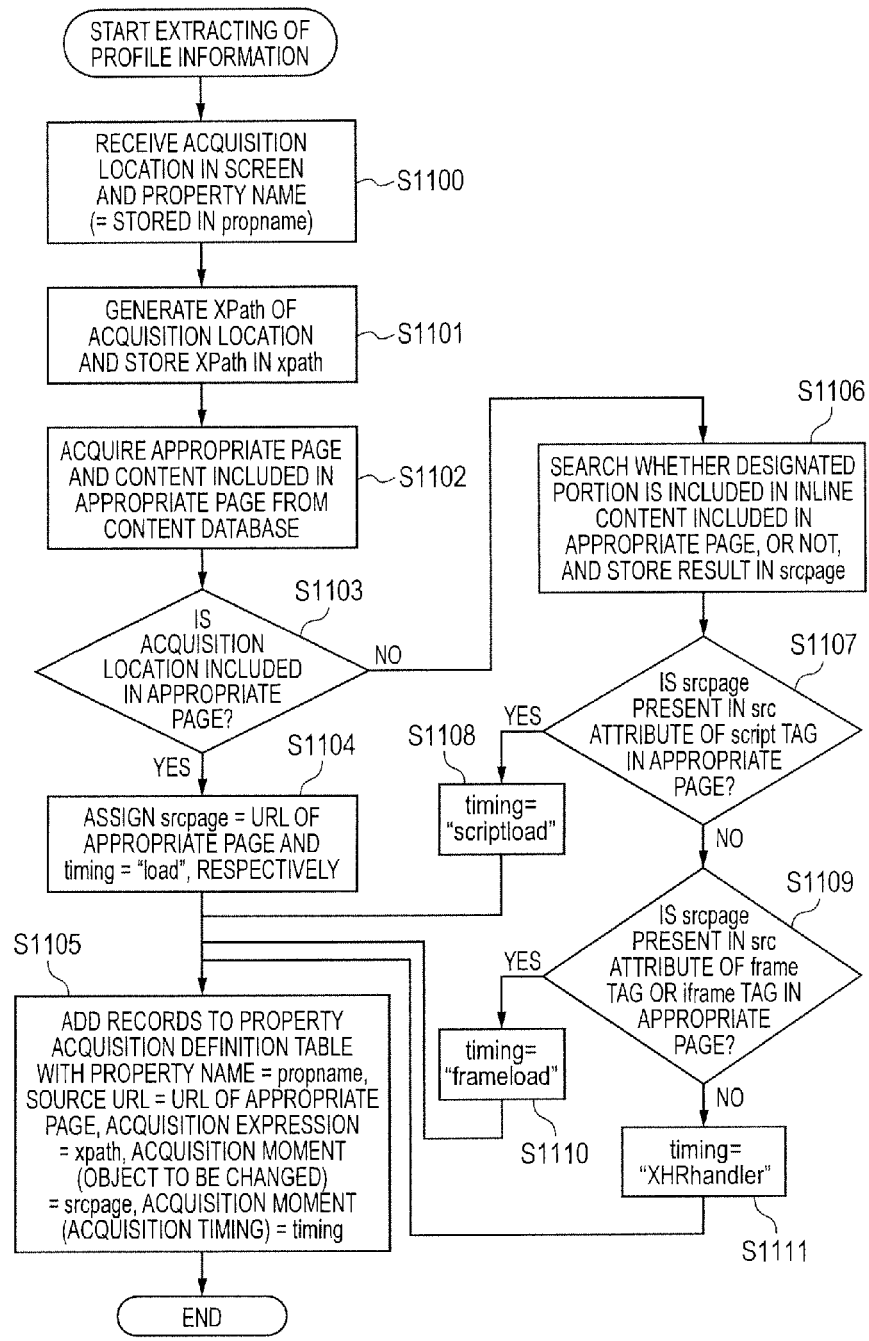
FIG. 11 is a flowchart illustrating an example of processing of setting support of a property acquisition definition in the computer system according to the first embodiment.

The search processing is illustrated in FIG. 11. First of all, the acquisition portion in the screen and the property name are received from the web browser module 200. In this example, the property name is stored in the linear transformation propname (S1100). Then, the XPath of the extraction area is generated, and stored in the linear transformation xpath (S1101). Then, the content included in the appropriate page and the appropriate page is captured from the content database (S1102). FIG. 12 illustrates the configuration of the content database. When the content database includes the URL (1201) of the content, the contents (1202) of the content, and the inline content (1203) if the content includes another content as the inline content.

Then, it is searched whether the extraction area is included in the appropriate page or not (S1103). If the extraction area is included in the appropriate page, the records are appended to the property capturing definition table 131 so as to simply capture the information after the display of the appropriate page has been completed. The URL of the appropriate page is set to the linear transformation, and "load" is set to the linear transformation timing (S1104). Finally, the records are appended to the property capturing definition table 131 with the property name=propname, the source url=the URL of the appropriate page, the extract expression=xpath, the moment of extract (change target)=srcpage, the moment of extract (capturing timing)=timing (S1105).

If the extraction area is not included in the appropriate page, it is searched whether the designated portion is included in the inline content included in the appropriate page or not, and the result is stored in the linear transformation srcpage (S1106).

Then, it is detected how srcpage is called from the appropriate page, and the capturing timing is estimated. If srcpage is present in the src attribute of the script tag in the appropriate page (S1107), it is determined the asynchronous communication using JSOP is conducted, and "scriptload" is stored in the linear transformation timing (S1108). If srcpage is present in the src attribute of the frame tag or the iframe tag in the appropriate page (S1109), it is determined that the asynchronous communication using the hidden frames are conducted, and "frameload" is stored in the linear transformation timing (S1110). If none of the above conditions is applied, it is determined that the asynchronous communication using the XHR is conducted, and "XHRHandler" is stored in the linear transformation timing (S1111). Finally, in Step S1105, the records are appended to the property capturing definition table 131.

As described above, the method of setting the property acquisition definition rule in this embodiment includes the content database that stores the response of the web application, and includes a step of recording the response of the web application in the content database, a step of designating the property extraction area on the web browser that displays the response, and a step of searching in which response the designated area is included, from the content database.

Also, the step of recording the response of the web application in the content database further includes a step of recording the top frame and the associated page called by the extension of the display of the top frame as a set, and the step of searching in which response the designated area is included, from the content database, includes a step of searching the designated area from the associated page, and determining the property acquisition rule through a method of calling the associated page hit by the search from the top page.

Further, this determination step includes a step of determining the property acquisition rule with reference to any src attribute of a script tag, a frame tag, and an iframe tag.

Second Embodiment

Next, a second embodiment describes the system capturing attribute information from multiple web pages and using it. Capturing the attribute information from the multiple web pages and constructing user's profile information can take more advanced control. FIG. 13 shows an example of the attribute information spanning the multiple pages. In this figure, the HTTP communications 1000 to 1003 indicate the same communications as those in an example of the application shown in FIGS. 9 and 10. Further, the HTTP communications 1300 and 1301 indicate that, after displaying index.jsp, the user displays member.jsp that displays member information.

The user profile information after the processing of the attribute information acquisition to the response of 1003 has been completed is configured as illustrated in FIG. 8. Then, when member.jsp is displayed, a property acquisition definition rule 178 illustrated in FIG. 1F is started, and the area information of the user is captured. As a result, as illustrated in FIG. 14, the profile information spanning a plurality of pages can be captured. In order to hold the profile information spanning the plurality of pages, the profile information is held in the HTTP Cookie where the scope of the variable is maintained over the pages, the UserData area, or the local storage function of the HTML5. Even in the case where the profile information spans the sessions of the application such that re-login is made, the profile information can be configured by specifying the user and putting the above client storage into practical use. With the above configuration, the capturing event of the operation logs can be controlled according to the attributes of a larger number of users, and the logs can be efficiently collected. The profile information can be saved on a server side as in the first embodiment. When data is saved, the data may be encrypted taking privacy into consideration. Any system may be used for encryption if the system can protect the data, such as independent encryption, a symmetric key cryptography system, or a public key cryptography system. Also, as the attribute information, specific data per se of the user may not be recorded, but abstracted information such as segmented classification may be provided. The segmenting can be realized by managing information for segmentation on the server side, and forwarding the information to the web browser module 200 as with the operation log capturing control definition table 130 or the property capturing definition table 131. With the abstracted attribute information, the profile information on the user can be recorded giving more consideration to privacy.

INDUSTRIAL APPLICABILITY

The invention explained in detail enables the control of levels of capturing operation logs and can effectively collect and analyze information for improving web applications

LIST OF REFERENCE SYMBOLS 100 client, 120 . . . web server, 130 operation log capturing control definition table, 131 . . . property capturing definition table, 140 . . . log server, 200 . . . web browser module, 201 script engine module, 220 . . . web server module, 221 . . . web application, 222 . . . module code injection module, 223 . . . operation log capturing module, 240 . . . log server module, 241 . . . log analysis module

The invention claimed is:

1. A method of recording operation in a web application, which records an operation log on a web page by a computer having a processing unit,
   wherein a property acquisition definition rule for capturing information from the web page and a log capturing control definition rule for controlling a recording range of the operation log on the basis of the captured information are provided; and
   the processing unit executes the steps of:
      setting an information acquisition event handler of the web page on the basis of the property acquisition definition rule;
      capturing information from the web page by the information acquisition event handler;
      controlling the recording range of the operation log on the web page on the basis of the captured information and the log capturing control definition rule; and
      recording the operation log,
      wherein the step of setting the information acquisition event handler includes a step of rewriting to call the information acquisition event handler, after completing a receive handler process responsive to a request different from a request to a top frame of the web page.

2. The method of recording operation in the web application according to claim 1, wherein the request different from the request to the top frame is a receive handler function of an XmlHttpRequest (XHR).

3. The method of recording operation in the web application according to claim 1, wherein the log capturing control definition rule includes at least a condition expression based on the information captured from the web page.

4. The method of recording operation in the web application according to claim 1, wherein the property acquisition definition rule includes at least information on an extraction area definition that designates an arbitrary area on the web page, a timing at which a designated area is captured, and an change target which is detected at the timing.

5. The method of recording operation in the web application according to claim 1, wherein the computer receives the property acquisition definition rule and the log capturing control definition rule through a network as a response to the request to the server device in which the web application operates.

6. The method of recording operation in the web application according to claim 1, wherein the computer sends the recorded operation to to the analyzing server device through a network.

7. A method of recording operation in a web application, which records an operation log on a web page by a computer having a processing unit,
   wherein a property acquisition definition rule for capturing information from the web page and a log capturing control definition rule for controlling a recording range of the operation log on the basis of the captured information are provided, and
   the processing unit executes the steps of:
      setting an information acquisition event handler of the web page on the basis of the property acquisition definition rule;
      capturing information from the web page by the information acquisition event handler;

controlling the recording range of the operation log on the web page on the basis of the captured information and the log capturing control definition rule; and recording the operation log, wherein a content database that stores a response of the web application is provided for setting the property acquisition definition rule, and the method executes:
  a step of recording the response of the web application in the content database;
  a step of designating a property extraction area on the web browser that displays the response; and
  a search step of searching in which response a designated area is included from the content database.

8. The method of recording operation in the web application according to claim 7,
  wherein the recording step further includes a step of recording a top frame and an associated page called by an extension of display of the top frame as a set; and
  the search step includes a determination step of searching the designated area from the associated page, and determining the property acquisition definition rule through a method of calling the associated page hit by the search from the top page.

9. The method of recording operation in the web application according to claim 8, wherein the determination step includes a step of determining the property acquisition definition rule with reference to any src attribute of a script tag, a frame tag, and an iframe tag.

10. A system for recording operation in a web application, which records an operation log on a web page by a client having a storage unit and a processing unit,
  wherein the storage unit is configured to store a property acquisition definition rule for capturing information from the web page, and a log capturing control definition rule for controlling a recording range of the operation log on the basis of the captured information; and
  the processing unit is configured to
    set an information acquisition event handler of the web page on the basis of the property acquisition definition rule;
    capture information from the web page by the information acquisition event handler; and
    control the recording range of the operation log on the web page on the basis of the captured information and the log capturing control definition rule,
  wherein the processing unit is configured to rewrite to call the information acquisition event handler, after completing a receive handler process responsive to a request different from a request to a top frame of the web page, when setting the information acquisition event handler.

11. The system for recording operation in the web application according to claim 10,
  wherein the processing unit is configured to rewrite a receive handler function of an)(FIR which is the request different from the request to the top frame to call the information acquisition event handier, after completing the receive handler process.

12. The system for recording operation in the web application according to claim 10, wherein the log capturing control definition rule includes at least a condition expression based on the information captured from the web page.

13. The system for recording operation in the web application according to claim 10, wherein the client is configured to receive the property acquisition definition rule and the log capturing control definition rule, which are stored in the storage unit, through a network as a response to the request to the server device in which the web application operates.

14. The system for recording operation in the web application according to claim 10, wherein the client is configured to send the recorded operation log to the analyzing server device through a network.

15. A system for recording operation in a web application, which records an operation log on a web page by a client having a storage unit and a processing unit,
  wherein the storage unit is configured to store a property acquisition definition rule for capturing information from the web page, and a log capturing control definition rule for controlling a recording range of the operation log on the basis of the captured informational;
  the processing unit is configured to
    set an information acquisition event handler of the web page on the basis of the property acquisition definition rule;
    capture information from the web page by the information acquisition event handler; and
    control the recording range of the operation log on the web page on the basis of the captured information and the log capturing control definition rule,
  wherein the property acquisition definition rule includes at least information on an extraction area definition that designates an arbitrary area on the web page, an change target which is detected, and a timing at which the designated area is captured.

* * * * *